(12) United States Patent
McCauley

(10) Patent No.: US 11,813,936 B2
(45) Date of Patent: Nov. 14, 2023

(54) DIVERTER SYSTEM AND METHODS FOR VEHICLE ENGINE COMPARTMENT

(71) Applicant: David McCauley, Greenwood, IN (US)

(72) Inventor: David McCauley, Greenwood, IN (US)

( * ) Notice: Subject to any disclaimer, the term of this patent is extended or adjusted under 35 U.S.C. 154(b) by 194 days.

(21) Appl. No.: 17/501,023

(22) Filed: Oct. 14, 2021

(65) Prior Publication Data

US 2022/0134867 A1 May 5, 2022

Related U.S. Application Data

(60) Provisional application No. 63/107,236, filed on Oct. 29, 2020.

(51) Int. Cl.
| | | |
|---|---|---|
| *B60K 11/08* | (2006.01) | |
| *B60R 16/02* | (2006.01) | |
| *B60S 1/66* | (2006.01) | |
| *B60Q 1/24* | (2006.01) | |
| *F01P 1/00* | (2006.01) | |

(52) U.S. Cl.
CPC .............. *B60K 11/08* (2013.01); *B60Q 1/24* (2013.01); *B60R 16/0215* (2013.01); *B60S 1/66* (2013.01); *F01P 2001/005* (2013.01)

(58) Field of Classification Search
CPC . B60K 11/08; B60Q 7/24; B60H 1/26; B60H 1/28; B60H 1/30; B60H 1/3435; B60H 1/3414; B60H 1/345; F01P 2001/005
See application file for complete search history.

(56) References Cited

U.S. PATENT DOCUMENTS

| | | | | |
|---|---|---|---|---|
| 4,410,032 A | * | 10/1983 | Mori ................... | B60K 11/085 123/41.58 |
| 9,744,921 B2 | * | 8/2017 | Yamaguchi ............ | B60K 13/02 |
| 9,902,433 B2 | * | 2/2018 | Metcalf ................ | B62D 25/12 |
| 10,766,628 B2 | * | 9/2020 | Scannell ............... | B64D 33/02 |
| 2017/0137068 A1 | * | 5/2017 | Kempfer ............... | B60H 1/267 |

* cited by examiner

*Primary Examiner* — Syed O Hasan
(74) *Attorney, Agent, or Firm* — Taft Stettinius & Hollister LLP; Wm. Michael Etienne

(57) ABSTRACT

A diverter assembly for a vehicle includes a spacer and a diverter coupled to the spacer; the spacer is configured to couple to a cooling assembly that provides access to an engine compartment of the vehicle, and when the spacer is coupled to the cooling assembly the diverter is aligned with a screen of the cooling assembly. The spacer may include an aperture configured to receive a fastener that secures a screen assembly of the cooling assembly to a frame of the cooling assembly. The fastener may simultaneously secure the diverter assembly to the frame of the cooling assembly.

19 Claims, 10 Drawing Sheets

DIVERTER SYSTEM AND METHODS FOR VEHICLE ENGINE COMPARTMENT

RELATED APPLICATIONS

This application claims priority to U.S. Provisional Application Ser. No. 63/107,236, filed Oct. 29, 2021, the disclosure of which is hereby incorporated by reference in its entirety.

FIELD OF THE DISCLOSURE

The present disclosure relates to a cooling assembly for an engine compartment of a motor vehicle, and more particularly, to diverter systems coupleable to the cooling assembly and methods related thereto.

BACKGROUND OF THE DISCLOSURE

Motor vehicles may be powered an engine housed in an engine compartment. The engine compartment may be accessible by opening an engine hood hinged or otherwise coupled to a body portion of the vehicle. As a result of operation of the engine and other factors, the engine compartment may experience high temperatures, which introduces a need for ventilation to cool the engine compartment. Ventilation systems may allow water, dirt, or other debris to pass into the engine compartment, which reduces the cleanliness of the engine compartment. The water, dirt, and other debris may also reduce of the vehicle life, and in particular, the life of the engine housed in the engine compartment. Therefore, that is needed is a system and method for diverting water, dirt, and other debris that may otherwise pass freely into the engine compartment to a more desirable location.

SUMMARY

In an illustrative embodiment of the present disclosure, a diverter assembly for a vehicle includes a spacer and a diverter coupled to the spacer. The diverter and the spacer may be a single piece or separate pieces. The spacer is configured to couple to a cooling assembly that provides access to an engine compartment of the vehicle, and when the spacer is coupled to the cooling assembly the diverter is aligned with a screen of the cooling assembly. The spacer may include an aperture configured to receive a fastener that secures a screen assembly of the cooling assembly to a frame of the cooling assembly, while simultaneously securing the diverter assembly to the frame of the cooling assembly. The diverter assembly may be part of a diverter system including a secondary diverter configured to direct water or debris to the diverter described above. The diverter system may also include a light system coupled to a defrost system of the vehicle.

In other embodiments, alternative diverter assemblies may be coupled to the cooling assembly as described in greater detail in the description and claims to follow.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
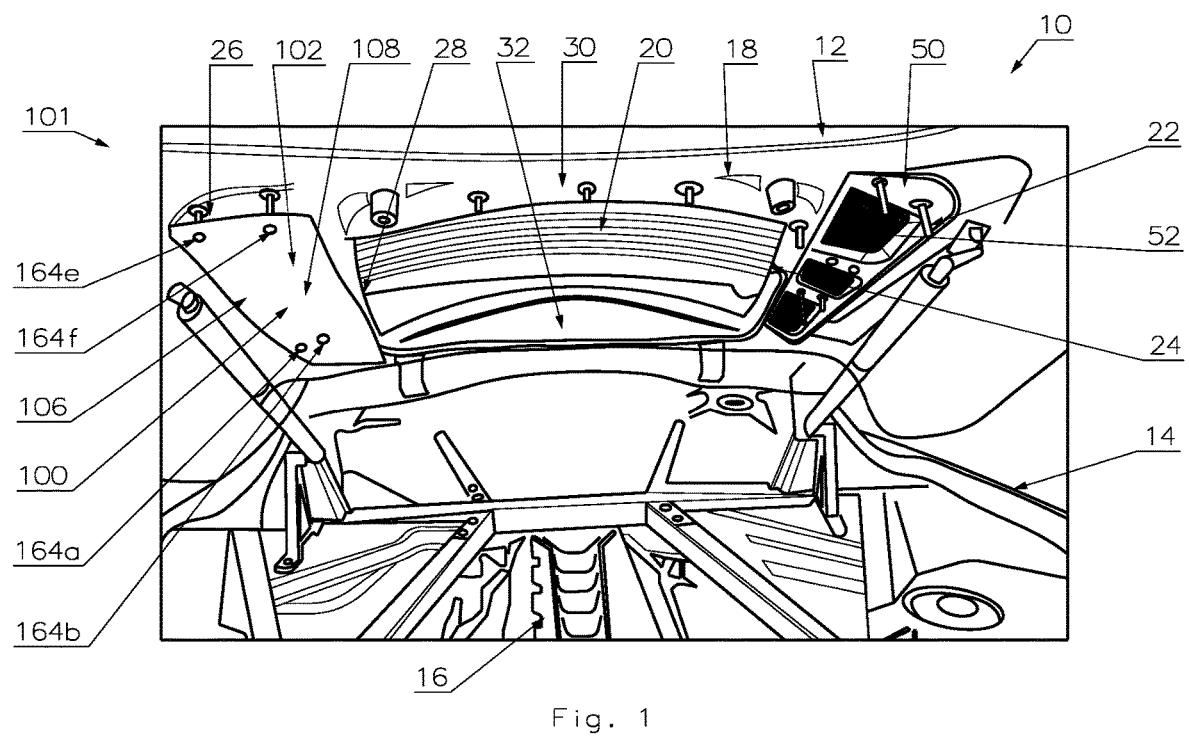
FIG. 1 is a rear perspective view of an engine compartment of a vehicle showing a cooling assembly having screens which facilitate access to the engine compartment.

Referring to FIG. 1, an exemplary embodiment of a vehicle 10 is shown. An engine hood assembly 12 is shown in an open position facilitating access to an engine compartment 14 of the vehicle 10. The vehicle 10 includes an engine 16 housed in the engine compartment 14. In the illustrative embodiment, the engine hood assembly 12 is pivotably mounted to a frame of the vehicle 10, and the engine hood assembly 12 is biased toward the open position via pneumatic cylinder actuators.

Figure 2:
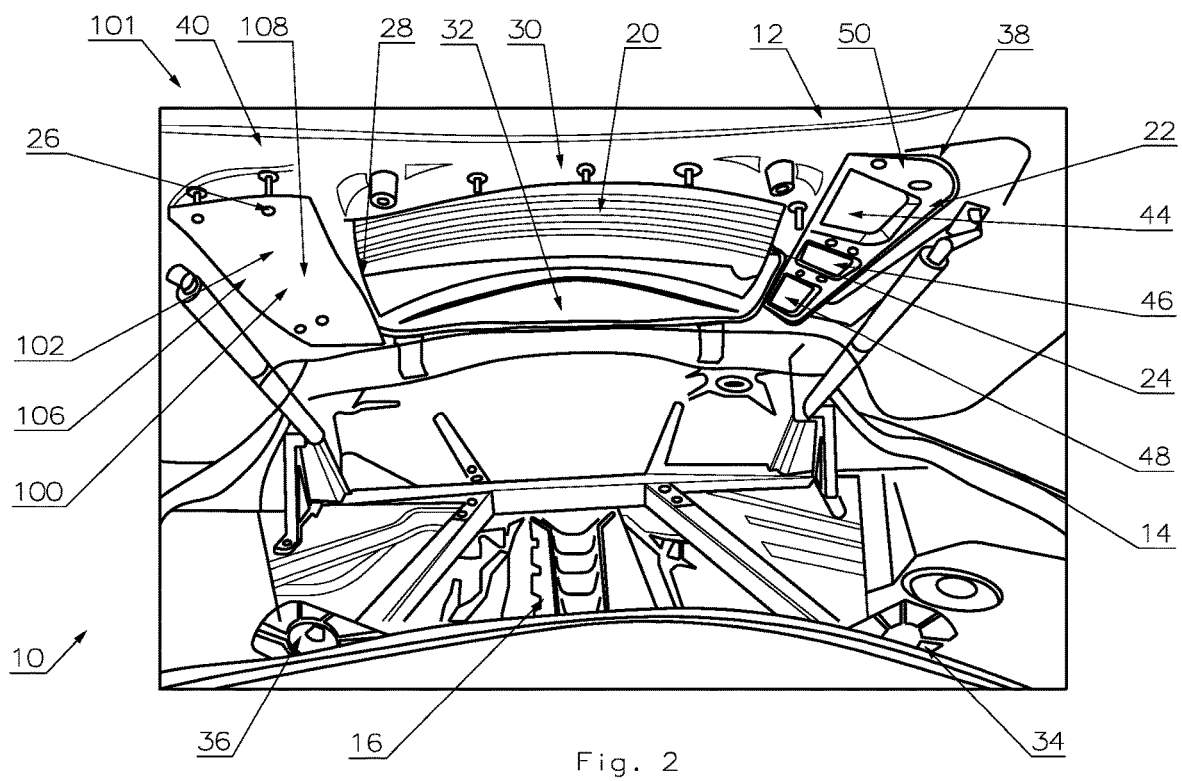
FIG. 2 is another rear perspective view the engine compartment of the vehicle showing an exemplary diverter and a drain to which the diverter directs water or debris entering the engine compartment.

The engine hood assembly 12 includes a hood frame 18 having a plurality of openings defined therein. A glass panel 20 is positioned in a first opening of the hood frame 18 and centered on the engine 16, as shown in FIGS. 1 and 2. The engine hood assembly 12 includes a first cooling assembly 22 positioned on a first side 24 of the glass panel 20 and a second cooling assembly 26 positioned a second side 28 of the glass panel 20. The engine hood assembly 12 further includes a rearward portion 30 and a forward portion 32. The forward portion 32 of the engine hood assembly 12 is positioned at a forward edge of the glass panel 20. The rearward portion 30 of the engine hood assembly 12 extends laterally between the first cooling assembly 22 and the second cooling assembly 26 and is positioned at a rearward edge of the glass panel 20. A space is defined between the rearward portion 30 of the engine hood assembly 12 and the rearward edge of the glass panel 20. The rearward portion 30 of the engine hood assembly 12 slopes below the rearward edge of the glass panel 20, which facilitates the passage of water and/or debris through the space and into the engine compartment 14 when the engine hood assembly 12 is in a closed position (not shown).

As shown in FIG. 2, vehicle 10 includes a first drain 34 and a second drain 36 each located in the engine compartment 14. When the engine hood assembly 12 is arranged in the closed position, the first drain 34 is positioned below, yet otherwise aligned with a rearward end 38 of the first cooling assembly 22. Similarly, the engine hood assembly 12 is arranged in the closed position, the second drain 36 is positioned below, yet otherwise aligned with a rearward end 40 of the second cooling assembly 26. It should be appreciated that the first cooling assembly 22 and the second cooling assembly 26 are mirror images of one another, yet otherwise identical such that any description of a cooling assembly applies equally to the first cooling assembly 22 and the second cooling assembly 26 unless otherwise stated.

As shown in FIG. 1, the cooling assembly 22 includes a frame 50 and a screen assembly 52 removably secured to the frame 50. In the illustrative embodiment, the frame 50 and the hood frame 18 are a single component; however, the disclosure herein is suitable for other cooling assembly formations as well. In the illustrative embodiment, the frame 50 defines three cooling holes 44, 46, 48 as shown in FIG. 2.

Figure 3:
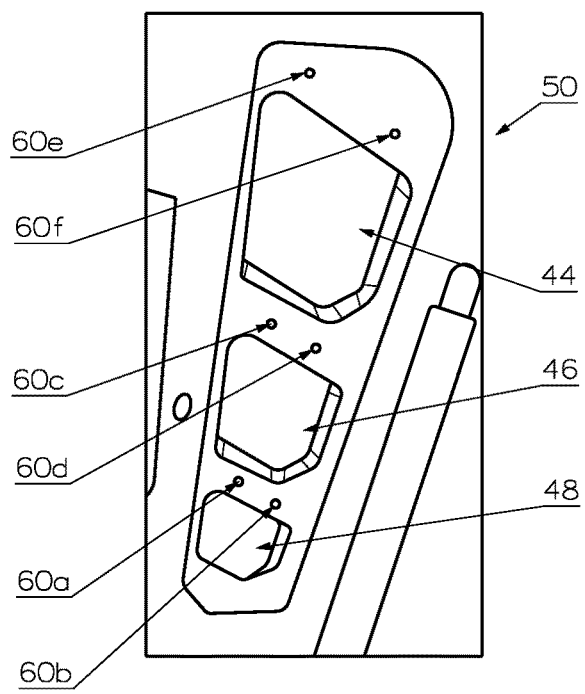
FIG. 3 is an exploded perspective view of a frame and a screen assembly of the cooling assembly of FIGS. 1 and 2.
Figure 3:
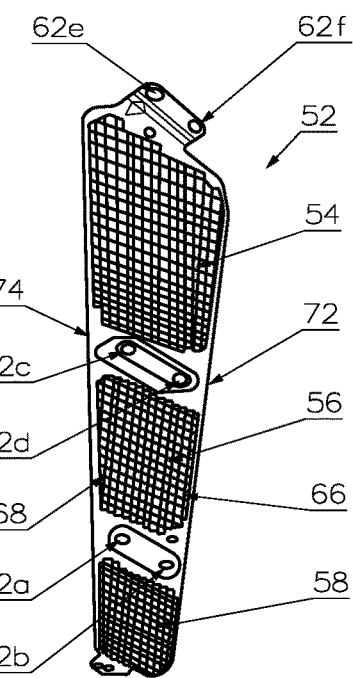

FIG. 3 shows the screen assembly 52 removed from the frame 50 of the cooling assembly 22. In the illustrative embodiment, the screen assembly 52 includes three screens 54, 56, 58, which are configured to align with the cooling holes 44, 46, 48, respectively, when the screen assembly 52 is secured to the frame 50. The screen assembly 52 further include a plurality of apertures 62a-f, which are configured to align with a plurality of apertures 60a-f of the frame 50, when the screen assembly 52 is secured to the frame 50. It should be appreciated that components described herein having a common base reference number and different letters may be identical components such that any description applies to each component having the common base reference number.

Figure 4:
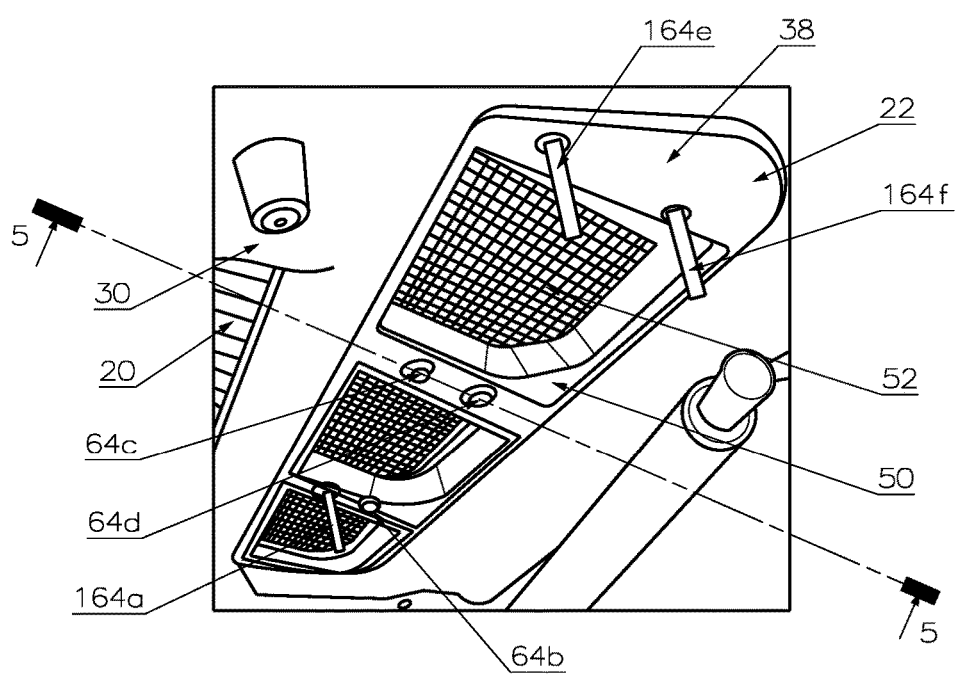
FIG. 4 is close-up perspective view of the cooling assembly showing that some fasteners provided by the original manufacturer have been replaced by post-type spacers of a diverter assembly.

FIG. 4 illustrates an enlarged view of the of the cooling assembly 22. The cooling assembly 22 includes a plurality of fasteners 64a-f sized and shaped to be inserted into the plurality of apertures 60a-f and the plurality of apertures 62a-f to secure the screen assembly 52 to the frame 50. The fasteners 64a-f may be threaded fasteners and may be the fasteners provided for the vehicle as originally manufactured. In the illustrative embodiment shown in FIG. 4, the fasteners 64c and 64d are positioned in their respective apertures securing the screen assembly 52 to the frame 50; however, the fasteners 64a, 64b, 64e, and 64f have been removed and replaced with posts 164a, 164b, 164e, and 164f to facilitate attachment of a diverter assembly 100 to the cooling assembly 22 as will be described in greater detail below.

Figure 5:
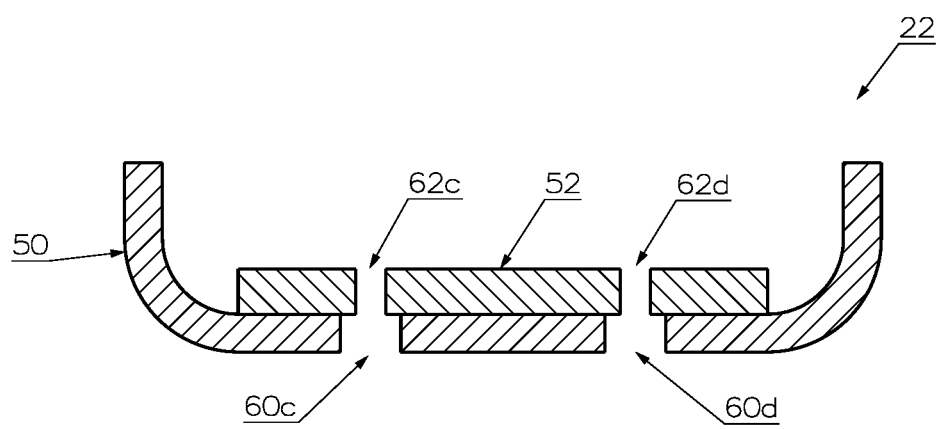
FIG. 5 is a cross section view of the cooling assembly showing apertures defined therein.

FIG. 5 is a cross-section view of the cooling assembly 22 shown in FIG. 4 taken across the line 5-5 in FIG. 4. In FIG. 5, the fasteners 64c and 64d have been removed from the cooling assembly 22. An alignment of the apertures 60c, 60d with the apertures 62c, 62d is shown in FIG. 5.

Referring now to FIGS. 1 and 2, an exemplary diverter assembly 100 is shown and is secured to the cooling assembly 22. When the diverter assembly 100 is secured to the cooling assembly 26, the system may be referred to, collectively, as a diverter system 101. The diverter assembly 100 includes a plurality of posts 164a-f configured to secure a diverter 102 to the cooling assembly 26. The posts may be referred to as spacers herein. The diverter 102 includes a plurality of apertures, e.g., 104a-f, configured to align with the plurality of apertures 60a-f and 62a-f when the diverter 102 is secured to the cooling assembly 26. In some embodiments, the diverter 102 may include a lesser number of apertures. For example, in the illustrative embodiment shown in FIGS. 1 and 2, fasteners 164a, 164b, 164e, and 164f, are inserted in the respective apertures defined in the frame 50 and the screen assembly 52 of the cooling assembly 26.

As suggested in FIGS. 1 and 2, when the diverter 102 is secured to the cooling assembly 26 and viewed in a direction perpendicular to the screen assembly 52 (i.e. a bottom-up view), the footprint of the diverter 102 extends to or beyond all portions of the screens 54, 56, 58 such that water or debris passing through the screens 54, 56, 58 is captured by the diverter 102. In the illustrative embodiment, the diverter 102 includes a groove 106 extending in the forward-aft direction and configured to direct water or debris captured by the diverter 102 to the drain 36. When the diverter 102 is secured to the cooling assembly 26, at least the groove 106 of the diverter 102 is sloped downwardly (relative to a level surface) as it extends rearwardly such that the water or debris captured by the diverter 102 is directed to the drain 36 when the vehicle is positioned on a level surface. In some embodiments, the groove 106 of the diverter 102 may be omitted, and instead the slope of the diverter 102 is sufficient to direct water or debris to a drain hole formed in the diverter 102. The drain hole may be of the type described with respect to diverter 202 below.

As suggested in FIGS. 1 and 2, an outer periphery 108 of the diverter 102 is spaced apart from the frame 50 of the cooling assembly 26 when the diverter is secured to the frame 50. The space between the outer periphery 108 of the diverter 102 and the cooling assembly 26 defines an air flow area between the diverter 102 and the frame 50 of the cooling assembly 26. The air flow area between the diverter 102 and the frame 50 is greater than the area flow area defined by the screens 54, 56, 58, such that the presence of the diverter 102 does not adversely affect the cooling efficiency of the engine compartment 14. In other words, a maximum air flow rate between the diverter 102 and the cooling assembly 26 is greater than a maximum air flow rate through the screen 54, 56, 58, cumulatively.

Figure 6:
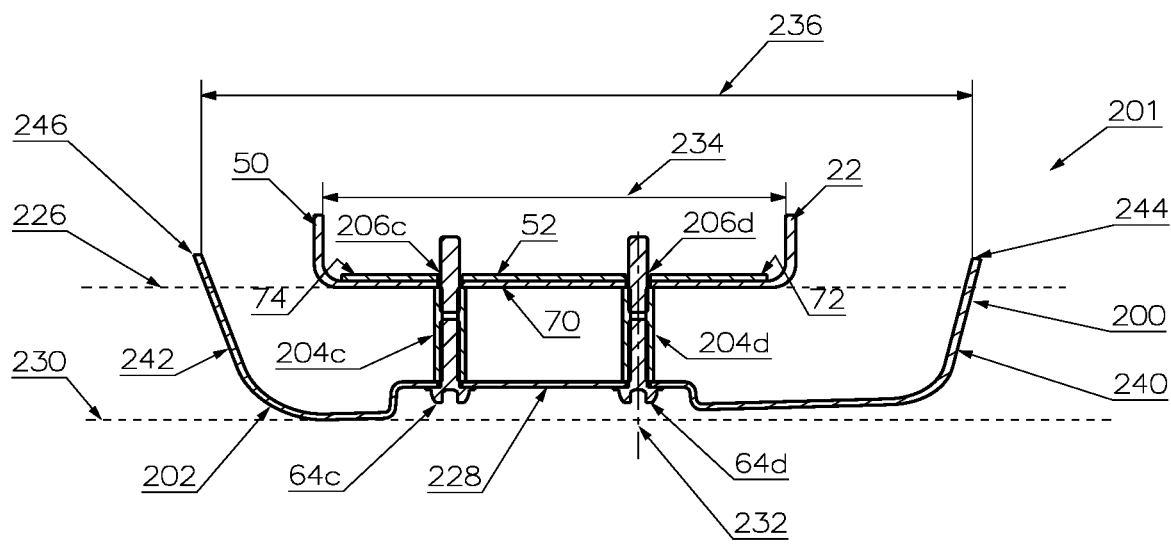
FIG. 6 is a cross section view of another diverter assembly showing standoff-type spacers secured to a diverter via the fasteners provided by the original manufacturer.

Referring now to FIG. 6, another diverter assembly 200 is illustrated as being removably secured to the cooling assembly 22. The diverter assembly 200 includes a diverter 202, a plurality of standoffs 204a-f, and a plurality of fasteners 206a-f (see FIGS. 10 and 11). The standoffs maybe referred to as spacers herein. The standoffs 204a-f are configured to align with the plurality of apertures 60a-f of the frame 50 and the plurality of apertures 62a-f of the screen assembly 52 when the diverter 202 is secured to the cooling assembly 22. The diverter assembly 200, the frame 50 of the cooling assembly 22, and the spacers 204a-f are included in a diverter system 201. The diverter system 201 differs from the diverter system 101 at least because the spacers of the diverter system 101 are posts whereas the spacers of the diverter system 201 are standoffs.

The illustrative embodiment shown in FIG. 6 is a cross-section view of the diverter system 201 taken through the apertures 60c, 60d of the frame 50, the apertures 62c, 62d of the screen assembly 52, and the standoffs 204c, 204d of the diverter assembly 200. As shown in FIG. 6, the fasteners 64c, 64d (subsequent to being removed from the cooling assembly 22) are configured to secure to the standoffs 204c, 204d to the diverter 202. Further, the fasteners 206c, 206d are configured to secure the standoffs 204c, 204d to the frame 50 of the cooling assembly 22 while simultaneously securing the screen assembly 52 to the frame 50.

Figure 10:
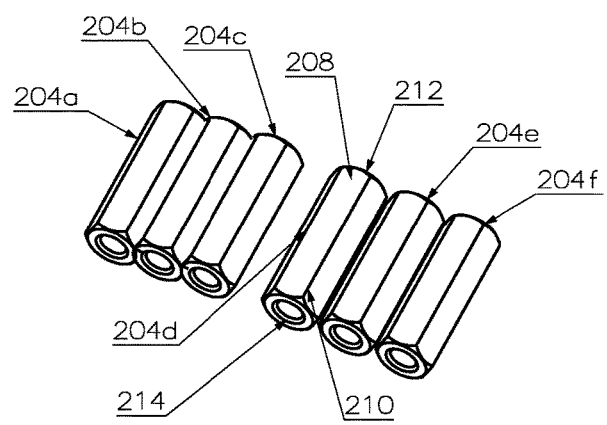
FIG. 10 is a perspective view of the standoff-type spacers shown in FIG. 6.
Figure 11:
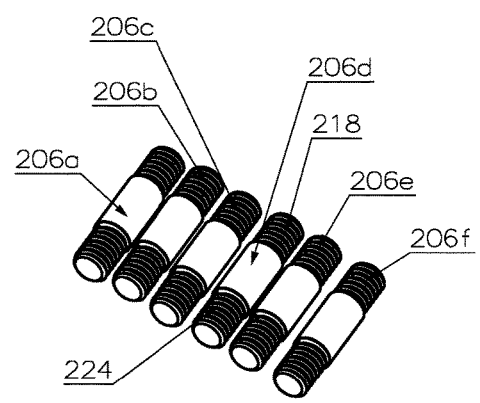
FIG. 11 is a perspective view of double-threaded fasteners configured to replace the fasteners provided by the original manufacturer when the fasteners provided by the original manufacturer are removed from the cooling assembly.

As shown in FIG. 10, the standoff 204d includes a first side 208 and a second side 210. A first threaded aperture 212 is defined in the first side 208, and a second threaded aperture 214 is defined in the second side 210. As shown in FIG. 11, the fastener 206d includes a first threaded side 218 and a second threaded side 224. In the illustrative embodiment, the first threaded side 218 and the second threaded side 224 of the fastener 206d are each configured to threadingly engage the first threaded aperture 212 and the second threaded aperture 214 of the standoff 204d. Further, the first threaded side 218 and the second threaded side 220 of the fastener 206d are each configured to threadingly engage the aperture 60d of the frame 50 and the aperture 62d of the screen assembly 52 to secure the components to one another. Thus, the fasteners 206a-f are configured to secure the standoffs 204a-f to the cooling assembly 22 when inserted in the apertures of the standoffs 204a-f, the apertures of the frame 50, and the apertures of the screen assembly 52. The threaded aperture that does not receive the fastener 206d receives the fastener 64d provided by the original manufacturer.

Figure 22:
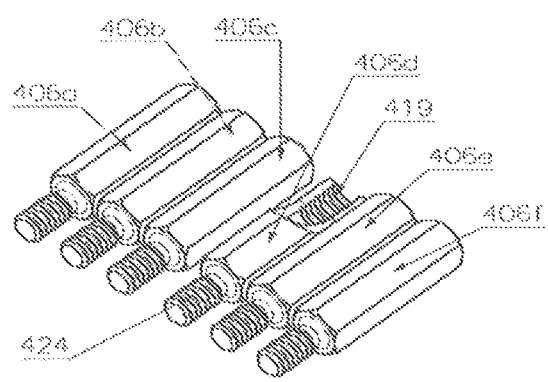
FIG. 22 is a perspective view of a monolithic standoff-fastener having a male thread at a first end and a female thread at a second end.

As shown in FIG. 22, e.g., the fastener and standoff may be formed as a single, monolithic component, referred to as a standoff-fastener 406. The standoff-fastener 406 may also be referred to as a spacer, as it too facilitates the desired spacing between the diverter and the frame via the standoff portion of the standoff-fastener 406. The standoff-fastener 406d, e.g., includes a first threaded side 224, being the male side, and a second threaded side 419, being the female side. The first threaded side 224 is configured to threadingly engage the aperture 60d of the frame 50 and the aperture 62d of the screen assembly 52 to secure the components to one another. The second threaded side 419 is configured to receive the faster 64d provided by the original manufacturer.

Figure 7:
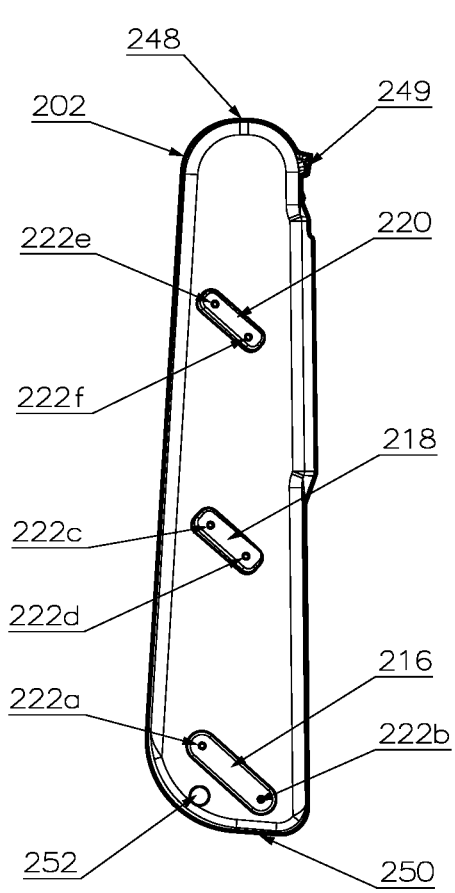
FIG. 7 is a top-down view of the diverter of FIG. 6 showing apertures defined therein, which are configured to receive the fasteners provided by the original manufacturer.
Figure 8:
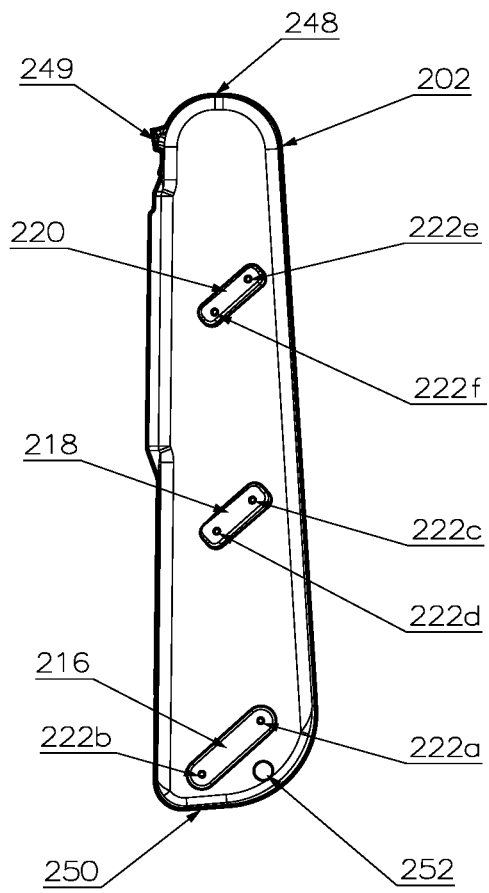
FIG. 8 is a bottom-up view of the diverter of FIG. 6 showing apertures defined therein, which are configured to receive the fasteners provided by the original manufacturer.

FIG. 7 is a top-down view of the diverter 202, and FIG. 8 is a bottom up view of the diverter 202 as the diverter 202 would appear when secured to the cooling assembly 22. FIG. 7 illustrates a plurality of angled, raised portions 216, 218, and 220 and a plurality of apertures 222a-f defined therethrough. (The portions 216, 218, and 220 appear as depressions in FIG. 8). The apertures 222a-f are sized and shaped to receive the fasteners 64a-f to secured the standoffs 204a-f to the diverter 202, as shown in FIG. 6.

In the illustrative embodiment, as shown in FIG. 6, the frame 50 of the cooling assembly 22 includes a bottom portion 70 extending along the plane 226, and the diverter 202 includes a bottom portion 228 extending along the plane 230. The bottom portion 228 of the diverter 202 is approximately parallel to the bottom portion 70 of the frame 50 when viewed in cross-section as shown in FIG. 6. In the illustrative embodiment, when the diverter assembly 200 is secured to the cooling assembly 22, the standoff 204d extends along an axis 232 that is perpendicular to the plane 230 along which the bottom portion 228 of the diverter 202 extends. In the illustrative embodiment, the diverter 202 not centered laterally on the screen assembly 52 but captures substantially all of the water and debris passing through the screens 54, 56, 58.

Referring still to FIG. 6, the diverter 202 includes a first side 240 and a second side 242. In the illustrative embodiment, the first side 240 and second side 242 are each curved and extend upwardly away from the bottom portion 228 of the diverter 202. The first side 240 includes an outermost edge 244 (sometimes called a lateral edge), and the second side 242 includes an outermost edge 246 (sometimes called a medial edge). The lateral edge 244 and the medial edge 246 each are each positioned above of the bottom portion 228 of the diverter 202. In some embodiments, the lateral edge 244 and medial edge 246 are each positioned below the bottom portion 70 of the frame 50 of the cooling assembly 22. In some embodiments, the lateral edge 244 and medial edge 246 are each positioned level with or above the bottom portion 70 of the frame 50 of the cooling assembly 22 as shown in FIG. 6.

As shown in FIGS. 3 and 6, the screens each extend laterally, e.g., the screen 56 extends from a first end 66 to a second end 68. When the diverter 202 is secured to the cooling assembly 22 and viewed in a direction perpendicular to the screen assembly 52 (i.e. a bottom-up view), the footprint of the diverter 202 extends to or beyond all portions of the screens 54, 56, 58 such that water or debris passing through the screens 54, 56, 58 is captured by the diverter 202. In other words, as shown in FIG. 6, the diverter 202 extends a distance 236 from the lateral edge 244 to the medial edge 246 thereof, and the distance 236 is greater than the distance 234.

The lateral and medial edges 244, 246 of the diverter 202 are spaced apart from the cooling assembly 22. The voids (or spaces) therebetween define an air flow area between the diverter 202 and the frame 50 of the cooling assembly 22. The air flow area between the diverter 202 and the frame 50 is greater than the area flow area defined by the screens 54, 56, 58, such that the presence of the diverter 202 does not adversely affect the cooling efficiency of the engine compartment 14. In other words, a maximum air flow rate between the diverter 202 and the cooling assembly 22 is greater than a maximum air flow rate through each screen 54, 56, 58, cumulatively, of the screen assembly 52.

Figure 21:
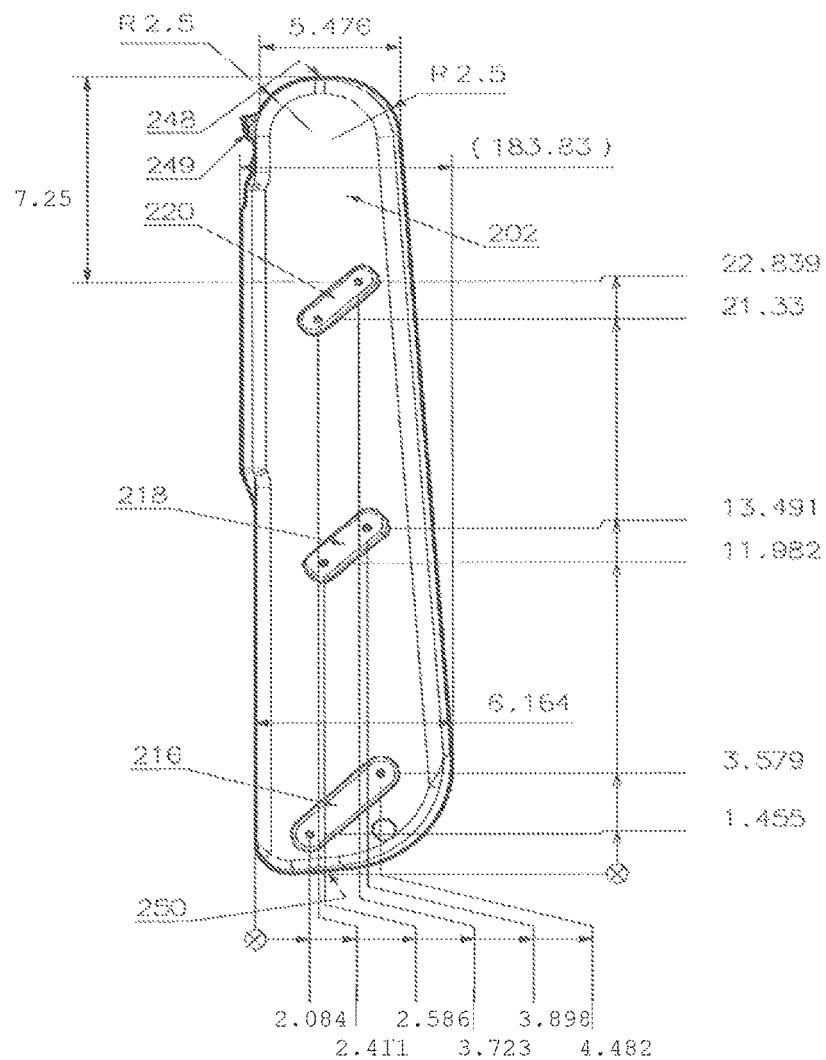
FIG. 21 is a cross section view of another diverter assembly including a diverter having a plurality of descending and overlapping sub-diverters configured to direct water and debris to a drain of the engine compartment.

As shown in FIGS. 7 and 8, the diverter 202 includes a forward end 248 and a rearward end 250. FIG. 21 shows exemplary dimensions of the diverter 202. FIGS. 7, 8, and 21 each show a receiving portion 249 which is configured to receive water and debris flowing from a secondary diverter 710 as described in greater detail below.

Figure 9:
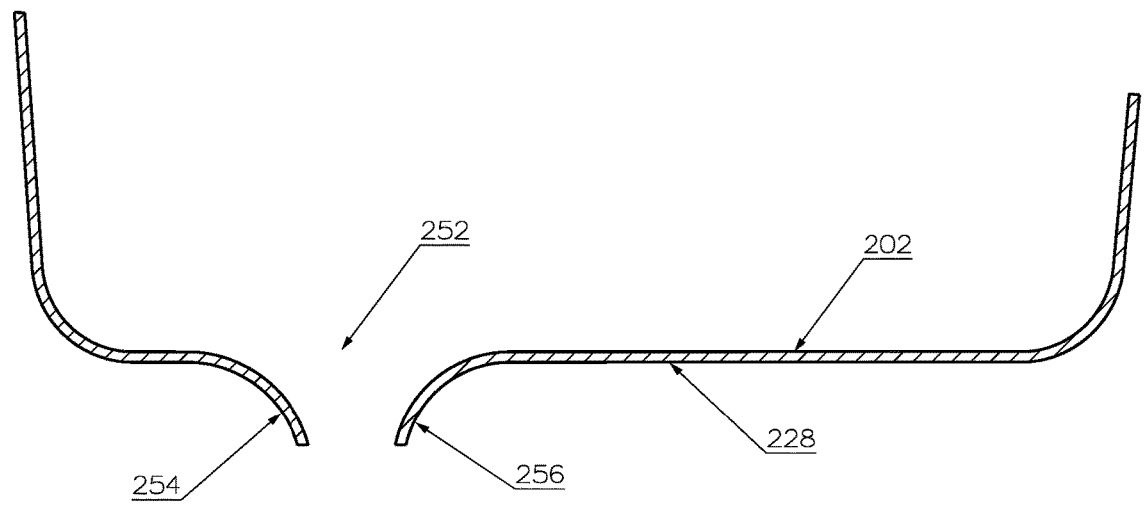
FIG. 9 is a rear view of the diverter of FIG. 6 showing a drain hole defined in the diverter and configured to direct water and debris to the drain in the engine compartment.

When the diverter 202 is secured to the cooling assembly 22, the diverter 202 is sloped downwardly (relative to a level surface) as it extends rearwardly such that the water or debris captured by the diverter 202 is directed to the drain 252 shown in FIGS. 7-9 when the vehicle 100 is positioned on a level surface. As shown in FIG. 9, in the illustrative embodiment, the drain hole 252 includes side walls 254, 256 extending downwardly from the bottom portion 228 of the diverter 202. The side walls 254, 256 may be curved as illustratively shown in FIG. 9. The drain hole 252 directs the water and debris captured by the diverter 202 to the drain 34 of the vehicle 10.

Figure 12:
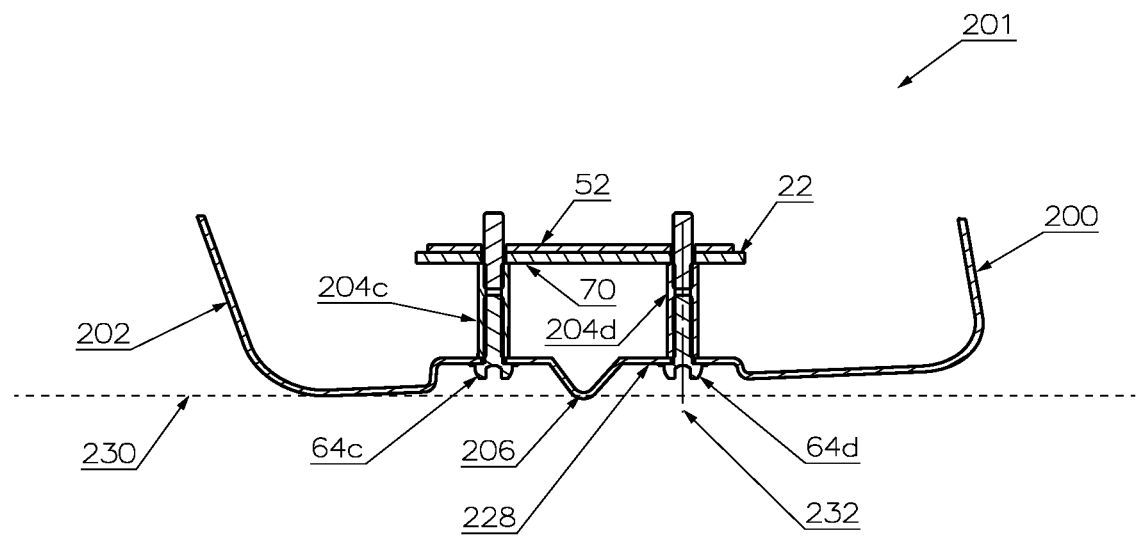
FIG. 12 is a cross section view a diverter assembly similar to the diverter assembly of FIG. 6 but including a guide channel configured to direct water or debris to the drain.

As shown in FIG. 12, in some embodiments, the drain hole 252 of the diverter 202 may be replaced by or provided in addition to a guide channel 206. The guide channel 206 is arranged to direct water or debris to the drain 34.

Figure 13:
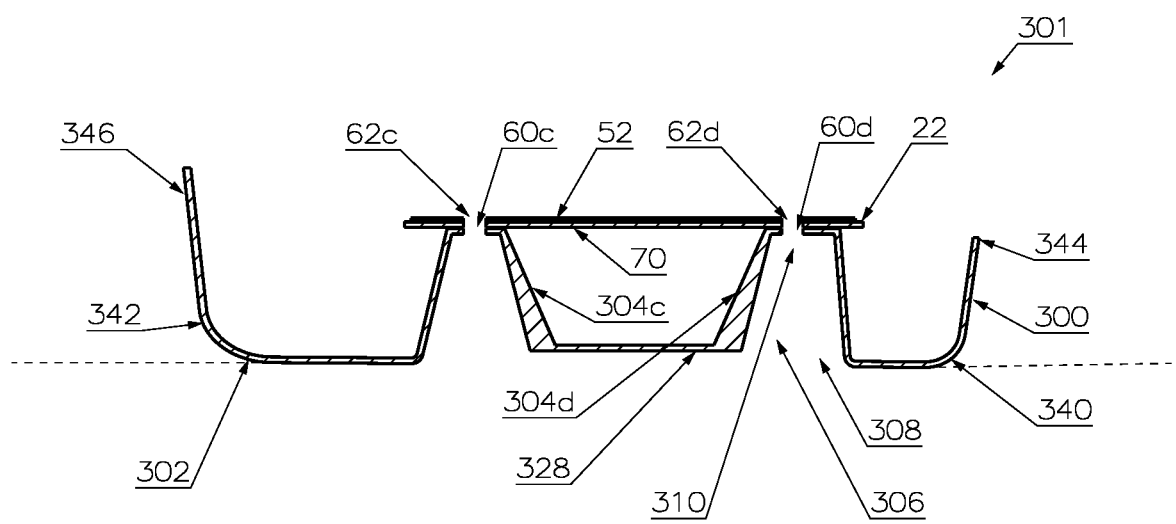
FIG. 13 is a cross section view of another diverter assembly showing boss-type or bore-type spacers defined in a diverter and configured to receive the fasteners provided by the original manufacturer to secure the diverter to the cooling assembly.

Referring now to FIG. 13, another diverter assembly 300 is illustrated as being removably secured to the cooling assembly 22. The diverter assembly 300 includes a diverter 302. The diverter 302 defines a plurality of bosses 304a-f, which may also be referred to as spacers herein. The boss 304d, for example, includes a bore 306 defined therein. The bore 306 includes an opening 308 defined at the end of the bore 306 positioned away from the cooling assembly 22 when the diverter 302 is secured to the cooling assembly 22. The boss 304d, for example, further includes an aperture 310 opening to the bore 308 at an end of the bore 308 abutting the cooling assembly 22 when the diverter 302 is secured to the cooling assembly 22. The bore 306 is sized and shaped to receive tools configured thread fasteners into the aperture 310, into the frame 50, and into the screen assembly 52 of the cooling assembly 22. These may be the fasteners 64a-f provided by the original manufacturer. The aperture 310 of the boss 304d is sized and shaped to receive the fastener 64d. The fastener 64d is configured to secure to the diverter 302 to the frame 50 of the cooling assembly 22 while simultaneously the securing the screen assembly 52 to the frame 50.

As shown in FIG. 13, the diverter 302 includes a first side 340 having a lateral edge 344 and a second side 342 having a medial edge 346. The sides 340, 342 extend upwardly from a bottom portion 328 of the diverter 302, similar to the description of the respective components of diverter 202. The edges 344, 346 define a width of the diverter 302, which is wider than the widest portion of the screens 54, 56, 58 of the screen assembly 52, similar to the description of the respective components of diverter 202. A shown in FIG. 13, the diverter 302 is spaced apart from the cooling assembly 22. The void or voids therebetween define an air flow area between the diverter 302 and the frame 50 of the cooling assembly 22. The air flow area between the diverter 302 and the frame 50 is greater than the area flow area defined by the screens 54, 56, 58, such that the presence of the diverter 302 does not adversely affect the cooling efficiency of the engine compartment 14, as described with respect to the diverter 202 above.

When the diverter assembly 300 is secured to the frame 50 of the cooling assembly 22, as shown in FIG. 13, the system may be referred to, collectively, as a diverter system 301. The diverter system 301 differs from the diverter system 201 at least because the spacers of the diverter system 201 are standoffs whereas the spacers of the diverter system 301 are bosses. The illustrative embodiment shown in FIG. 13 is cross-section view of the diverter system 301 taken through the apertures 60c, 60d of the frame 50, the apertures 62c, 62d of the screen assembly 52, and the bosses 204c, 204d of the diverter assembly 200.

Figure 14:
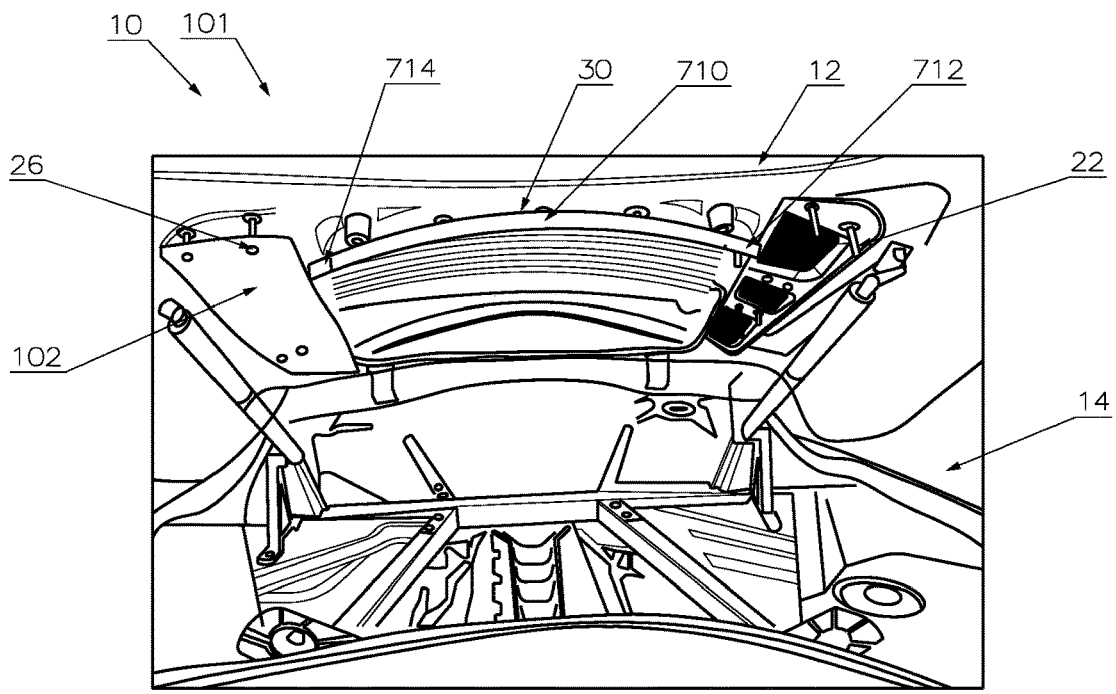
FIG. 14 is another rear perspective view of the engine compartment showing a secondary diverter configured to capture water and debris passing into the engine compartment from a location rearward of a glass panel of an engine hood assembly of the vehicle.
Figure 15:
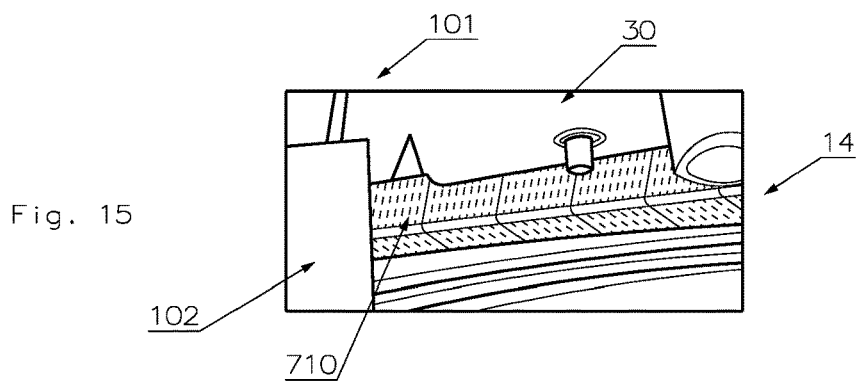
FIG. 15 is a close-up perspective view showing that the secondary diverter is arranged to direct water and debris to the diverters described in the FIGS. above.
Figure 16:
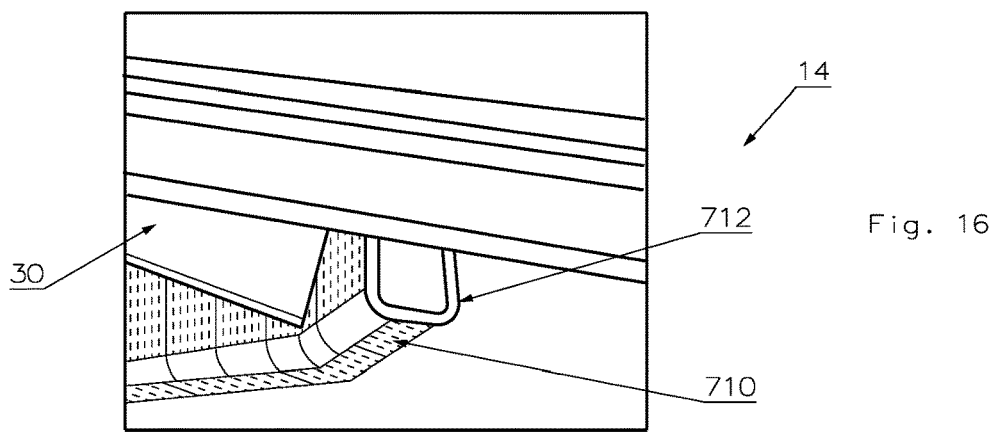
FIG. 16 is a close-up view of a first end of the secondary diverter showing that the second diverter is u-shaped.

As illustratively shown in FIGS. 14-16 in some embodiments, any of the diverter systems described herein may include a secondary diverter 710. As shown semi-diagrammatically in FIG. 14, the secondary diverter 710 is configured to be positioned on the rearward portion 30 of the engine hood assembly 12 such that the secondary diverter 710 extends laterally adjacent the rearward portion 30. The secondary diverter 710 includes a first end 712 that is positioned subjacent the cooling assembly 22 and a second end 714 that is positioned subjacent the cooling assembly 26 when the secondary diverter 710 is secured to the rearward portion 30 of the engine hood assembly 12.

When the diverters, e.g., diverters 202, are each secured to respective cooling assemblies 22, 26, the first and second ends 712, 714 of the secondary diverter 710 are positioned above respective diverters (e.g., diverters 202). A first side of the secondary diverter 710 is sloped downwardly toward the first end 712, and a second side of the secondary diverter 710 is sloped downwardly toward the second end 714. As described above, the space defined between the rearward portion 30 of the engine hood assembly 12 and the rearward edge of the glass panel 20 facilitates the passage of water and/or debris through the space and into the engine compartment 14. The secondary diverter 710 is arranged to capture the water or debris passing through the space and direct the water and debris toward the diverters (e.g., diverters 202).

FIGS. 14-16 illustratively show a diverter system 101 in which the driver side diverter 102 is secured to the cooling assembly 26, but the passenger side diverter 102 is not secured to the cooling assembly 22. The first end 712 of the secondary diverter 710 facilitates the flow of water and debris to the driver side diverter 102. As shown in FIG. 16, in the illustrative embodiment, the secondary diverter 710 is a u-shaped (or otherwise curved) channel. The secondary diverter 710 may be removably secured to the rearward portion 30 of the engine hood assembly 12 or to another component of the diverter system via fasteners and/or apertures.

Figure 19:
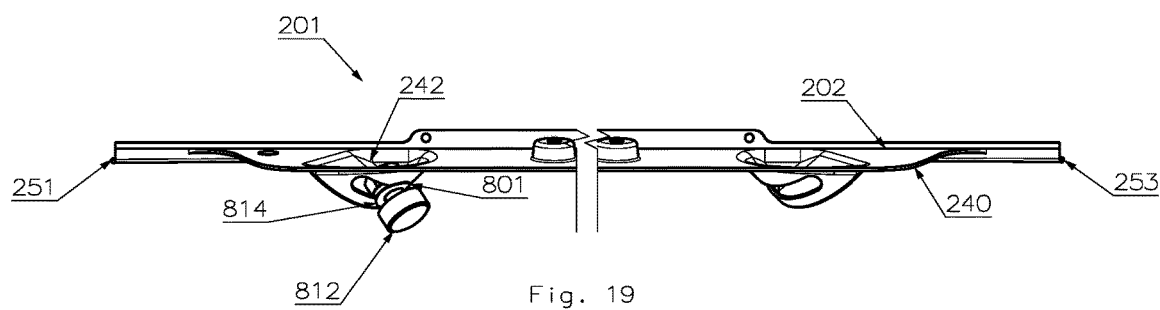
FIG. 19 is a perspective view of the light system showing a light of the light system mounted on a light mount of the light system.

As shown in FIG. 19, the secondary diverter 710 includes first and second terminating ends 251, 253, and the terminating ends are configured to direct water and debris flowing therefrom into the receiving portion 249 of the one of the main diverters (e.g., 202). Therefore, the terminating end 251 or 253 of the secondary diverter 710 is arranged directly above, or coupled with the receiving portion 249 of the diverter 202.

Figure 17:
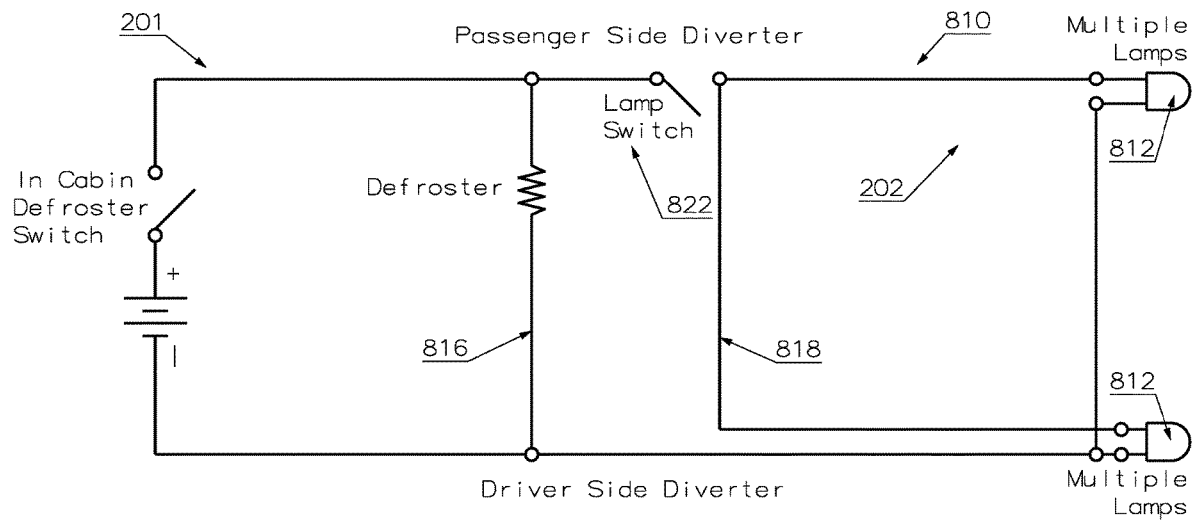
FIG. 17 is a schematic view of a light system positioned on the diverter and a light circuit coupled to a defrost circuit of the vehicle.
Figure 18:
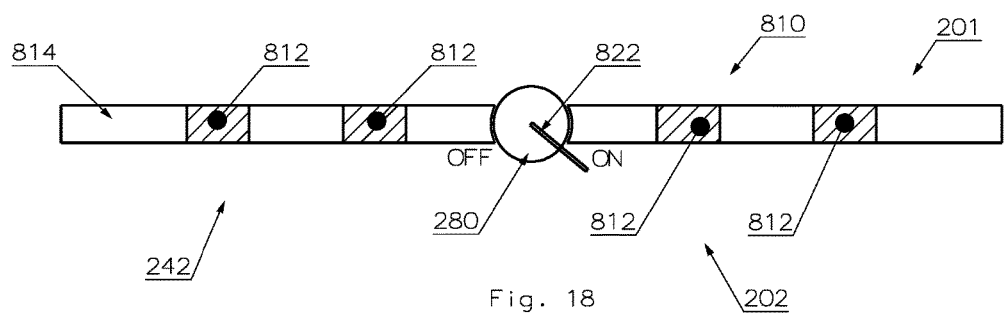
FIG. 18 is a side-view of a diverter having the light system secured thereto and showing that the light system includes a switch to operate the defrost system independently of the light system.

FIGS. 17-19 illustrative show a light system 810 which may be included in any of the diverter systems described herein. FIG. 18 shows a side view of the diverter 202 and the light system 810, and FIG. 19 shows a cross section view of the diverter 202 and the light system 810 The light system 810 includes one or more lights 812. The one or more lights 812 may be LED lights or other types of lights. In the illustrative embodiment, the lights 812 are positioned on a light mount 814, which is coupled to an outer medial surface of a diverter (e.g., diverter 202). The outer medial surface of the diverter 202 may be sloped or curve introducing light-mounting challenges, and the outer medial surface may not direct the beam of a light that is mountable thereto toward a desired location. Therefore, the light mount 814 may be a ramp-shaped structure having a first side configured to abut the diverter (e.g., diverter 202) and a second side, which is flat and configured to support the one or more lights 812 thereon. The one or more lights 812 may be directed toward the engine 16 for illumination thereof. The light system 810 provides preferred high and broad areas of lighting pointing downward and crisscrossing light paths providing full illumination, as opposed to point lights that do not fully light up the engine compartment 14 and point more horizontally and/or are lower. Batteries and remote controls are not required as described below. In some embodiments, the one or more lights 812 or other components of the light system 810 may be coupled to other components of the vehicle 10, such as other frames or surfaces with the engine compartment 14.

FIG. 17 shows a diagrammatic view of the electrical components of the light system 810. The vehicle 10 includes a defrost system having a defrost circuit 816. The light system 810 includes a light circuit 818 which is electrically coupleable to the defrost circuit 816. The light system 810 includes a wiring harness, which facilitates electrical connection of the light circuit 818 to the defrost circuit 816. For example, the wiring harness includes connectors, terminals, wires, and electrical insulations to electrically couple to the light circuit 818 to the defrost circuit 816. When the light circuit 818 is electrically coupled to the defrost circuit 816, the one or more lights 812 of the light system 810 may be powered via the defrost circuit 816. The defrost system may include a switch in the cabin of the vehicle 100 that, when switched to an ON position provides, power to the defrost circuit 816. The light system 810 includes a light circuit switch 822 that extends through an aperture 280 defined in the diverter 202. When the light circuit switch 822 is switched to an ON position, and the switch of the defrost system is switched to the ON position, the one or more lights 812 are powered by the defrost circuit 812 and the light circuit 818. When the light circuit switch 822 is switched to an OFF position, the one or more lights 812 receive no power whether the switch of the defrost system is in the ON or OFF position.

Figure 20:
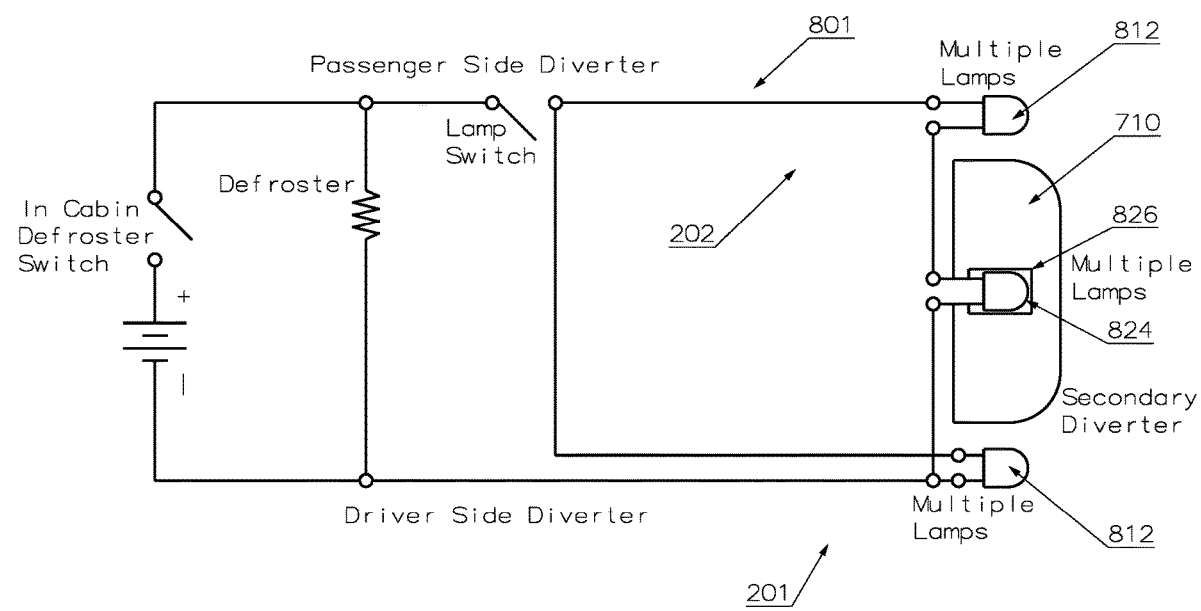
FIG. 20 is schematic partial diagrammatic view of the light system showing that a light may be mounted on a light mount mounted on the secondary diverter.

As shown in FIG. 20, the light system 810 may include an additional one or more lights 824 coupled to the secondary diverter system 710. The additional one or more lights 824 may be mounted on a second light mount 826 to direct the light sufficient and provide a sufficient mounting surface for the additional one or more lights 824, as described above.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A diverter system for a rear engine vehicle comprising: an engine compartment located at a rear end of the rear engine vehicle; an engine hood assembly including a cooling assembly including a screen providing airflow access to the engine compartment to facilitate cooling of the engine compartment; a diverter positioned within the engine compartment, aligned with the screen, and configured to receive water or debris that passes through the screen; and a spacer extending between the cooling assembly and the diverter; wherein the spacer includes a first end coupled to the diverter and a second end coupled to the cooling assembly; wherein the diverter includes a drain hole; and wherein the diverter is sloped downwardly toward the drain hole.

2. The diverter system of claim 1, wherein the spacer is removably coupled to the cooling assembly.

3. The diverter system of claim 1, wherein the diverter system further comprises: a first fastener configured to secure the first end of the spacer to the diverter; and a second fastener configured to secure the second end of the spacer to the cooling assembly.

4. The diverter system of claim 3, wherein the cooling assembly further includes a frame having an aperture defined therein; and wherein the first fastener and the second faster are each insertable with the aperture defined in the frame of the cooling assembly to secure the screen to the frame.

5. The diverter system of claim 1, wherein the diverter includes a medial edge and a lateral edge; wherein a width of the diverter is defined by a distance between the medial edge and the lateral edge; and wherein the width of the diverter is greater than a width of the screen.

6. The diverter system of claim 5, wherein the spacer is coupled to a bottom portion of the diverter; and
wherein the lateral edge and the medial edge each are positioned above of the bottom portion of the diverter.

7. The diverter system of claim 1, further comprising: a drain positioned in the engine compartment; wherein the drain hole is arranged to direct water or debris toward the drain.

8. The diverter system of claim 1, further comprising: a secondary diverter extending in a different direction than the diverter; wherein the secondary diverter is configured to direct into the diverter.

9. The diverter system of claim 1, further comprising: a defrost circuit configured to power a defrost system, the defrost system having a defrost switch positioned within a cabin of the rear engine vehicle; and a light system including lights positioned on the diverter and a light circuit configured to provide power to the lights; wherein when the defrost switch is positioned in a first position no power is provided to the defrost circuit, and when the defrost switch is positioned in the second position power is provided to the defrost circuit; and wherein the light circuit is electrically coupleable to the defrost circuit to provide power to the lights.

10. The diverter system of claim 9, wherein the light system includes a light switch and the light switch is positioned in the engine compartment;
wherein the light switch is movable between a first position and a second position;
wherein when the light switch is in the second position and the defrost switch is in the second position power is provided to the light circuit from the defrost circuit;

wherein when the light switch is in the second position and the defrost switch is in the first position no power is provided to the light circuit; and wherein when the light switch is in the first position no power is provided to the light circuit.

11. The diverter system of claim 1, wherein a maximum air flow rate between the diverter and the cooling assembly is greater than a maximum air flow rate through each screen, cumulatively, of the cooling assembly when the diverter assembly is secured to the cooling assembly.

12. The diverter system of claim 1, wherein an area of air flow defined through each of the screens of the cooling assembly, collectively, is less than an area of air flow defined between the diverter and the cooling assembly when the diverter assembly is secured to the cooling assembly.

13. A diverter assembly for a rear engine vehicle comprising: a spacer; a diverter configured to couple to the spacer; wherein the spacer is configured to couple to a cooling assembly of an engine hood assembly that provides airflow access to an engine compartment located at a rear end of the rear engine vehicle to facilitate cooling of the engine compartment; wherein when the spacer is coupled to the cooling assembly the diverter is aligned with a screen of the cooling assembly to receive water or debris that passes through the screen; wherein the diverter includes a drain hole; and wherein when the diverter is coupled to the cooling assembly the diverter is sloped downwardly toward the drain hole.

14. The diverter assembly of claim 13, wherein the spacer includes a threaded aperture configured to receive a fastener provided by the original manufacturer; and and wherein the fastener provided by the original manufacturer is configured to secure a screen assembly of the cooling assembly to a frame of the cooling assembly as originally provided by the manufacturer.

15. The diverter assembly of claim 1, wherein the spacer is a standoff.

16. The diverter assembly of claim 1, wherein the spacer is a bore formed in the diverter.

17. A method of assembling a diverter system, comprising: providing a diverter assembly for a rear engine vehicle, the diverter assembly including a spacer and a diverter coupled to the spacer, wherein the diverter includes a drain hole; removing a fastener from apertures defined in a frame and a screen assembly of a cooling assembly of an engine hood assembly, wherein prior to removal the fastener secures the screen assembly to the frame of the cooling assembly; aligning the diverter with a screen of the screen assembly such that the diverter is configured to receive water or debris that passes through the screen and is sloped downwardly toward the drain hole; and inserting the fastener in an aperture defined in the spacer to fix the diverter to the cooling assembly when the diverter is aligned with the screen.

18. The method of claim 17, further comprising:
inserting a second fastener of the diverter assembly into a second aperture defined in the spacer; and
inserting the second fastener in the apertures defined in the frame and the screen assembly to secure the diverter assembly to the cooling assembly and to simultaneously re-secure the screen assembly to the frame.

19. The method of claim 17, further comprising:
coupling a light circuit of a light system to a defrost circuit of a defrost system, the light system including a light positioned on the diverter.

* * * * *